United States Patent [19]

Takano et al.

[11] Patent Number: 5,360,959
[45] Date of Patent: Nov. 1, 1994

[54] DIRECT CURRENT RESISTANCE WELDING MACHINE AND METHOD OF CONTROLLING THE SAME

[75] Inventors: Fumitomo Takano; Hitoshi Saito; Yuko Suzuki; Kenji Miyanaga; Gen Tujii, all of Sayama, Japan

[73] Assignee: Honda Giken Kogyo Kabushiki Kaisha, Tokyo, Japan

[21] Appl. No.: 76,146

[22] Filed: Jun. 14, 1993

[30] Foreign Application Priority Data

Jun. 15, 1992 [JP] Japan .................................. 4-155011
Sep. 17, 1992 [JP] Japan .................................. 4-247818

[51] Int. Cl.⁵ .......................................... B23K 11/24
[52] U.S. Cl. .................................. 219/110; 219/116
[58] Field of Search ................. 219/109, 110, 116

[56] References Cited

U.S. PATENT DOCUMENTS 4,973,815  11/1990  Ito et al. ................. 219/110
5,196,668   3/1993  Kobayashi et al. ......... 218/110

FOREIGN PATENT DOCUMENTS 237861    3/1987   European Pat. Off. .
63-273575 10/1988  Japan .
2225909   6/1990   United Kingdom .

*Primary Examiner*—Clifford C. Shaw

[57] ABSTRACT

A direct current resistance welding machine and a method of controlling the direct current resistance welding machine wherein primary current of a welding transformer is detected when a plurality of switching devices of an inverter are controlled based on corresponding pulses having a predetermined frequency and each having a time width corresponding to the value of a required secondary current. Rise and fall times of the detected primary current are detected. An upper limit frequency Of the primary current is computed based on the time width of each pulse and on the rise and fall times. Thus, the primary current of the welding transformer is controlled by controlling the switching devices based on pulses having a frequency falling within the computed upper limit frequency.

12 Claims, 9 Drawing Sheets

FIG.6
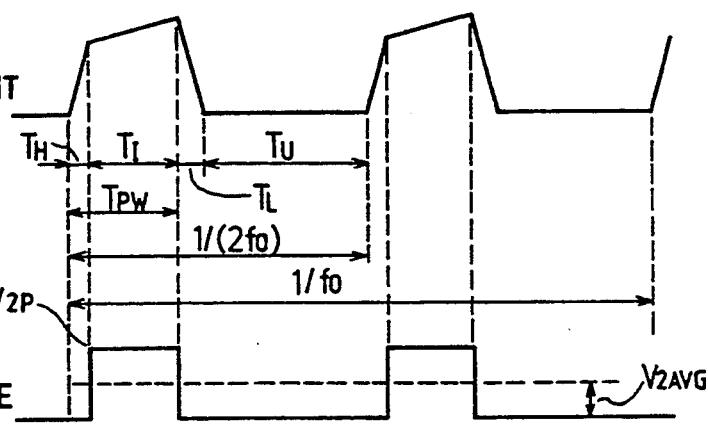
(a) PRIMARY CURRENT
(b) SECONDARY VOLTAGE
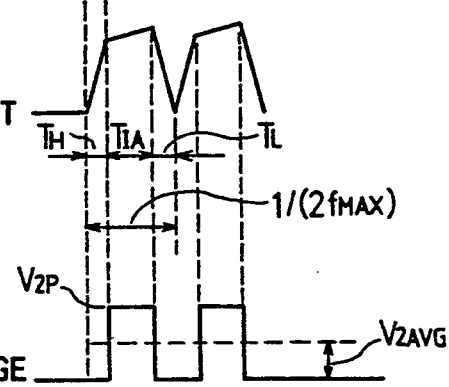
(c) PRIMARY CURRENT
(d) SECONDARY VOLTAGE

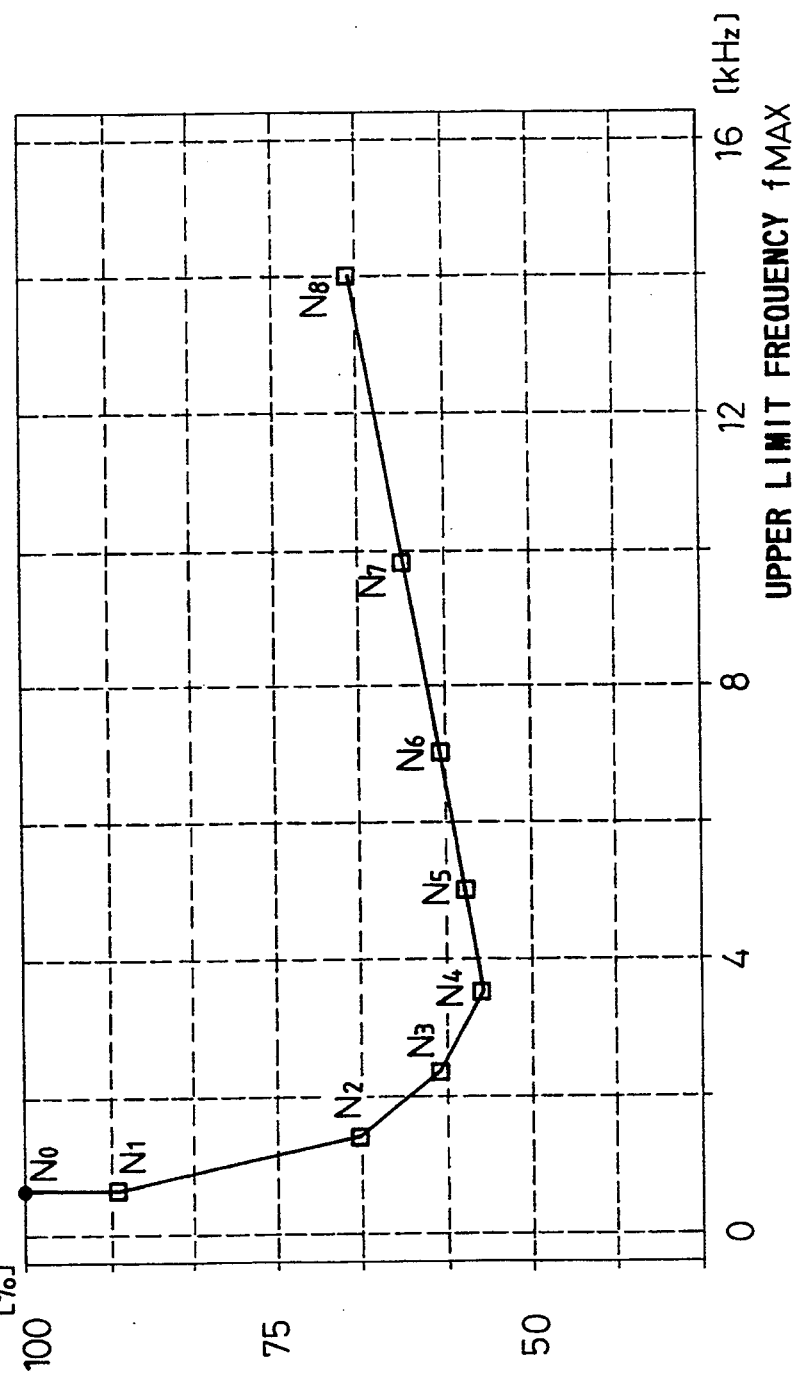

DIRECT CURRENT RESISTANCE WELDING MACHINE AND METHOD OF CONTROLLING THE SAME

BACKGROUND OF THE INVENTION

1. Field of the Invention

This invention relates to a direct current resistance welding machine and a method of controlling the direct current resistance welding machine.

2. Description of the Background Art

Varying the frequency of a primary current in the welding transformer according to variations in a load on the secondary side, in an inverter-type direct current resistance welder or welding machine, has been disclosed in Japanese Patent Application Laid-Open Publication No. 63-273575. In such an inverter-type direct current resistance welding machine, the welding transformer is controlled within a range of the frequency at which the iron core of the welding transformer is magnetically unsaturated, by supplying a primary current of a high frequency when the value for setting a welding current is small or, supplying a primary current of a low frequency when the welding current setting value is large.

When the conventional control such as slow-up control for successively increasing the welding current at the beginning of energization, waveform control effected for the duration of energization, etc. is effected, the frequency of the primary current varies each time according to the state of the load on the secondary side. The frequency of the primary current of the welding transformer thus cannot be accurately set up.

Therefore, an operator usually made combinations of test pieces and their corresponding welding guns and measured welding conditions including the frequency of the primary current. Further, the operator inputted the measured welding conditions to a control unit in advance. Then, the operator specified the welding conditions which had been inputted in advance based on the objects to be welded and the welding gun to be used before welding. Thereafter, the welding was carried out under the specified welding conditions. Complex welding conditions such as slow-up control, waveform control, etc., required much time to determine.

According to the inverter type direct current resistance welding machine, it has been known that the iron core of the welding transformer can be reduced in sectional area by increasing the frequency of the primary current, thereby making it possible to reduce the welding transformer size and weight.

In the method of reducing the welding transformer in size by increasing the frequency of the primary current, however, an output voltage $V_0$ is greatly reduced at a predetermined frequency, e.g., 1 kHz or higher according to time intervals required for the primary current of the welding transformer to rise and fall. Thus, even if the welding transformer is reduced in size by simply increasing the frequency, the desired output cannot be obtained.

SUMMARY OF THE INVENTION

It is an object of the present invention to provide a direct current resistance welding machine for computing an upper limit frequency of a primary current for obtaining a welding current required for a load on the secondary side and controlling the primary current within the range of the computed upper limit frequency and to provide a method of controlling the direct current resistance welding machine.

It is another object of the present invention to provide a direct current resistance welding machine having a small-sized, light and high efficiency welding transformer, fabricated based on the correlation between the ratio of the number of turns in the primary winding to the number of turns in the secondary winding and the amount of change in primary current, which appear during rise and fall times of a primary current.

According to one aspect of the present invention, for achieving the above objects, there is provided a method of controlling a direct current resistance welding machine, comprising the steps:

a first step for detecting a primary current of a welding transformer at the time that a plurality of switching devices of an inverter are controlled based on corresponding pulses having a predetermined frequency and each having a time width corresponding to the value of a required secondary current;

a second step for detecting rise and fall times of the detected primary current; and a third step for computing an upper limit frequency of the primary current based on the time width of each pulse referred to above and the rise and fall times, whereby the primary current of the welding transformer is controlled by controlling the switching devices based on pulses having a frequency falling within the upper limit frequency.

According to another aspect of the present invention, there is provided a direct current resistance welding machine comprising:

a detector for detecting a primary current of a welding transformer when a plurality of switching devices of an inverter are controlled based on corresponding pulses having a predetermined frequency and each having a time width corresponding to the value of a required secondary current;

a differentiation for differentiating the detected primary current;

first and second comparators means for effecting comparison between the level of an output produced by the differentiation and a first predetermined level and between the level of the output and a second predetermined level respectively;

first and second measuring circuit for measuring output producing periods of the first and second comparators respectively; and a computing circuit for computing an upper limit frequency of the primary current of the welding transformer based on the periods measured by the first and second measuring circuits and the time width, whereby the frequency of the primary current of the welding transformer is controlled by controlling the switching devices based on pulses having a frequency falling within the upper limit frequency.

According to a further aspect of the present invention, there is provided a direct current resistance welding machine for controlling a primary current with an inverter comprised of switching devices driven by pulses, which comprises:

a welding transformer fabricated by setting an upper limit frequency of the primary current supplied to the welding transformer based on the amount of change in primary current per unit time, which appears during either one of rise and fall times of the controlled primary current and the ratio of the number of turns in the primary winding to the number of turns in the secondary winding of the welding transformer and by determining a sectional area of an iron core selected based on the set upper limit frequency.

According to the method of controlling the direct current resistance welding machine of the present invention, the primary current of the welding transformer at the time that the switching devices of the inverter are controlled based on the corresponding pulses having the predetermined frequency and each having the time width corresponding to the value of the required secondary current is detected in the first step. Further, the rise and fall times of the detected primary current are detected in the second step. Moreover, the upper limit frequency of the primary current is computed based on the time width of each pulse referred to above and the rise and fall times in the third step. Thus, the primary current of the welding transformer is controlled by controlling the switching devices based on the pulses having the frequency which falls within the upper limit frequency of the primary current of the welding transformer.

According to the direct current resistance welding machine of the present invention, the primary current of the welding transformer at the time that the switching devices of the inverter are controlled based on the corresponding pulses having the predetermined frequency and each having the time width corresponding to the value of the required secondary current, is detected by the detector. Then, the detected primary current of the welding transformer is differentiated by the differentiator. The level of the differentiated output produced by the differentiator and the first and second predetermined levels are respectively compared by the first and second comparators. Thus, a rise time of the primary current of the welding transformer is detected by the first comparator and a fall time of the primary current thereof is detected by the second comparator.

Further, the rise time of the primary current of the welding transformer is measured by the first measuring circuit, whereas the fall time of the primary current thereof is measured by the second measuring circuit. Based on the measured rise and fall times and the pulse time width, the upper limit frequency of the primary current of the welding transformer is computed by the computing circuit. Thus, the frequency of the primary current of the welding transformer is controlled by controlling the switching devices based on the pulses having the frequency falling within the upper limit frequency which has been computed by the computing circuit.

Furthermore, the direct current resistance welding machine of the present invention has the welding transformer fabricated based on the value obtained by determining the upper limit frequency of the pulse-shaped primary current supplied to the welding transformer by the relationship between the amount of change in primary current per unit time, which occurs during either one of the rise and fall times of the primary current and the primary-to-secondary turns ratio of the welding transformer, and the value obtained by determining the sectional area of the iron core of the welding transformer based on the determined upper limit frequency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent by the following description and the appended claims, taken in conjunction with the accompanying drawings in which preferred embodiments of the present invention are shown by way of illustrative example only, and thus are not limitative of the present invention, and wherein:

FIG. 6 is a timing chart describing the computation of an upper limit frequency of the primary current flowing in the welding transformer employed in the embodiment of the present invention;

FIG. 9 is a graph describing the relationship of the turn ratio of the welding transformer, the upper limit frequency of the primary current and the weight of the welding transformer.

DETAILED DESCRIPTION OF THE PREFERRED EMBODIMENTS

A direct current resistance welder or welding machine and a method of controlling the direct current resistance welding machine, according to the present invention will be described in detail with reference to the accompanying drawings in which preferred embodiments are shown by way of illustrative example, in connection with a system for effecting the above method.

Figure 1:
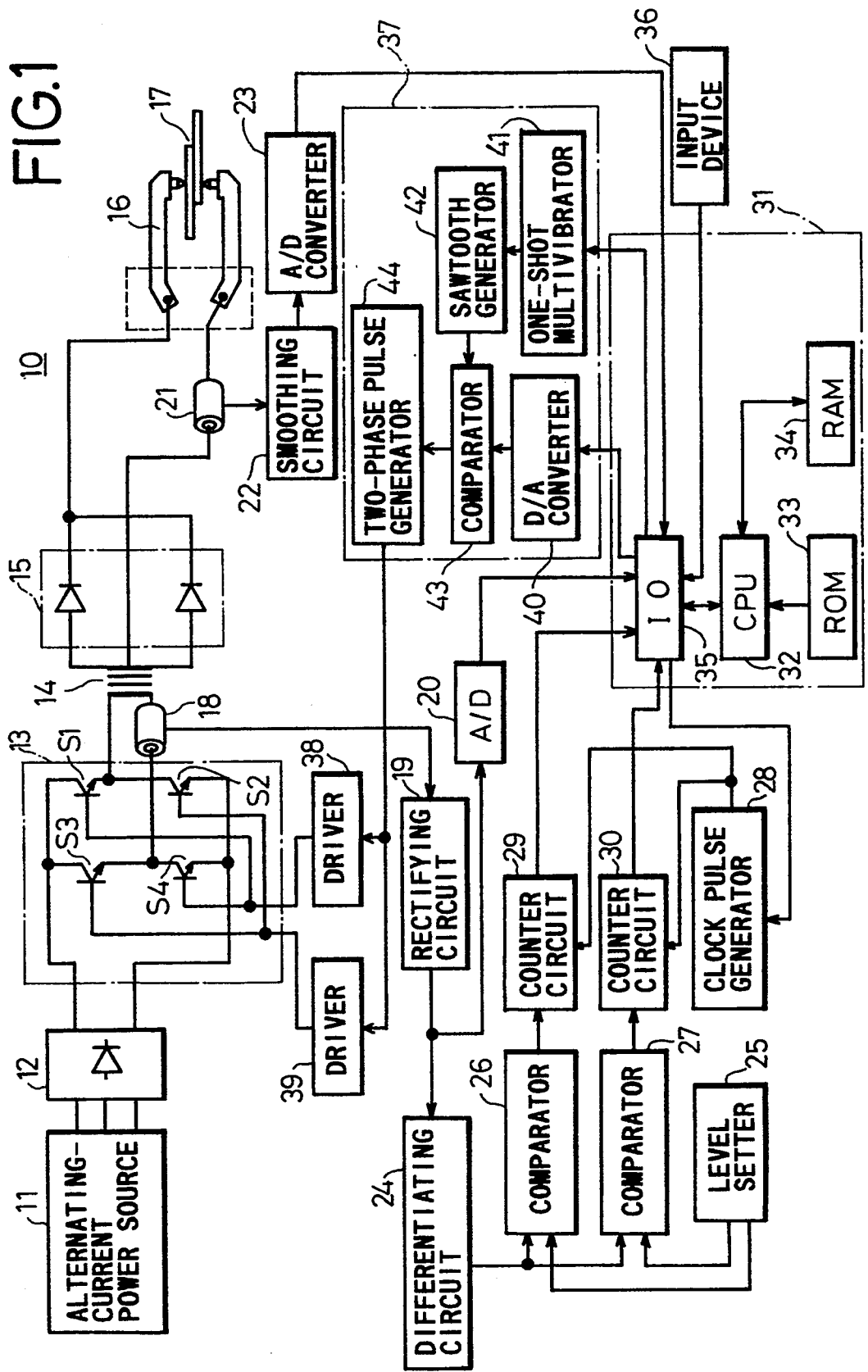
FIG. 1 is a block diagram showing the structure of an inverter type direct current resistance welding machine to which one embodiment of the present invention has been applied.

FIG. 1 is a block diagram showing the structure of an inverter type direct current resistance welding machine 10 to which one embodiment of the present invention has been applied.

In machine 10, a rectifying circuit 12 converts electric power represented in the form of alternating current, i.e., alternating-current power which has been supplied from an alternating-current power source 11, into direct current. Then, an inverter 13 comprised of switching devices S1 through S4 such as transistors, converts the electric power outputted by the rectifying circuit 12 into alternating-current power. Thereafter, the inverter 13 supplies a primary current to a welding transformer 14. Further, a full-wave rectifier 15 effects full-wave rectification on a secondary current in the welding transformer 14 and supplies the resultant current to a welding gun 16 so that objects 17 to be welded are subjected to resistance welding.

Further, a current detecting coil 18 detects the primary current flowing in the welding transformer 14. Then, a rectifying circuit 19 effects full-wave rectification on the detected primary current. Thereafter, an A/D converter 20 converts the rectified output into digital data. On the other hand, a current detecting coil 21 detects the secondary current flowing in the welding transformer 14 and a smoothing circuit 22 smooths the detected secondary current. Thereafter, an A/D converter 23 converts the smoothed output into digital data.

To compute an upper limit frequency $f_{MAX}$ to be described later, machine 10 supplies the output of the rectifying circuit 19 to a differentiating circuit 24 where the output is differentiated. In addition, machine 10 causes a comparator 26 to compare the level of a first set output produced from a level setter 25 and the level of an output produced by the differentiating circuit 24. Then, machine 10 causes a comparator 27 to compare the level of a second set output produced by the level setter 25 and the level of an output produced by the differentiating circuit 24. Further, machine 10 causes a counter circuit 29 to count the number of clock pulses outputted by a clock pulse generator 28 during a period in which the output of the comparator 26 is being generated. Moreover, machine 10 causes a counter circuit 30 to count the number of the clock pulses generated by the clock pulse generator 28 during a period in which the output of the comparator 27 is being produced. Thereafter, machine 10 supplies the counts of the counter circuits 29 and 30 to a control device 31 to be described later, thereby computing the upper limit frequency $f_{MAX}$. Now, the frequency of the clock pulses generated by the clock pulse generator 28 is set up based on the output of the control device 31.

The control device 31 is functionally provided with a welding current controller for effecting slow-up control for on-off controlling the switching devices S1 through S4 in response to the outputs of the A/D converters 20 and 23 thereby to effect slow-up control for slowly increasing the secondary current of the welding transformer 14 based on welding conditions, and waveform control for controlling the waveform of current flowing during energization, for example, and an upper limit frequency computing circuit for computing the upper limit frequency $f_{MAX}$.

Further, the control device 31 also has a central processing unit ("CPU") 32, a ROM 33 having programs stored therein for effecting processes such as an upper limit frequency computation and the welding current control well as having data corresponding to an ON period $T_{PW}$ of the switching devices, which is associated with the required secondary current, a RAM 34 having data storage areas in addition to working areas, and an input/output ("I/O") port 35. The control device 31 effects predetermined control based on information inputted from an input device 36, which is indicative of a combination of the welding guns 16 and the objects 17 to be welded, information about the instruction for the measurement of the upper limit frequency, etc.

Furthermore, the machine 10 also has a PWM modulator 37 for generating both a PWM modulated output and a PWM modulated output adjusted so as to have a phase shift of 180° with respect to the former PWM modulated output in response to switching device control data and a frequency setting timing pulse both outputted by control device 31. Drivers 38 and 39 respectively amplify the modulated outputs produced by the PWM modulator 37 and respectively effect the ON-OFF control of the switching devices S1 through S4 based on the amplified outputs.

As is known, the PWM modulator 37 causes a D/A converter 40 to convert the switching device control data outputted by the control device 31 into an analog signal. In response to the frequency setting timing pulse outputted by the control device 31, the PWM modulator 37 causes a one-shot multivibrator 41 to generate a timing pulse and causes a sawtooth generator 42 inputted with the timing pulse to generate a sawtooth output synchronized with the timing pulse. Further, the PWM modulator 37 causes a comparator 43 to compare the level of the analog signal converted by the D/A converter 40 and the level of the sawtooth output generated by the sawtooth generator 42, and allows the comparator 43 to produce a PWM modulated output based on the result of comparison. Then, the PWM modulator 37 causes a two-phase pulse generator 44 to make a 180° phase shift with respect to the input PWM modulated output and supplies a PWM modulated output which is a 0° phase shift, i.e., in phase with the input supplied by the comparator 43, and a PWM modulated output 180° out of phase with the input, to their corresponding drivers 38 and 39.

In machine 10 constructed as described above, an operator fits the objects 17 to the welding guns 16 as test pieces for the computation of the upper limit frequency. Further, the operator inputs an instruction for the combination of the test pieces and the welding gun 16 and an instruction for computing the upper limit frequency using the input device 36. The operation of machine 10 for controlling the secondary current based on the input instructions will be described next.

Data about the value of the required secondary current to be outputted to the objects 17 used as the test pieces by the welding transformer 14, is read from ROM 33 based on the above instructions. Further, both a timing pulse based on the read data and switching device control data synchronized with the timing pulse are outputted by the control device 31. The one-shot multivibrator 41 supplied with the timing pulse outputs a train of pulses (FIG. 2 line (a)) in synchronization with the timing pulse. The sawtooth generator 42 outputs a sawtooth wave (FIG. 2 line (b)) based on the train of pulses outputted by the one-shot multivibrator 41.

Figure 2:
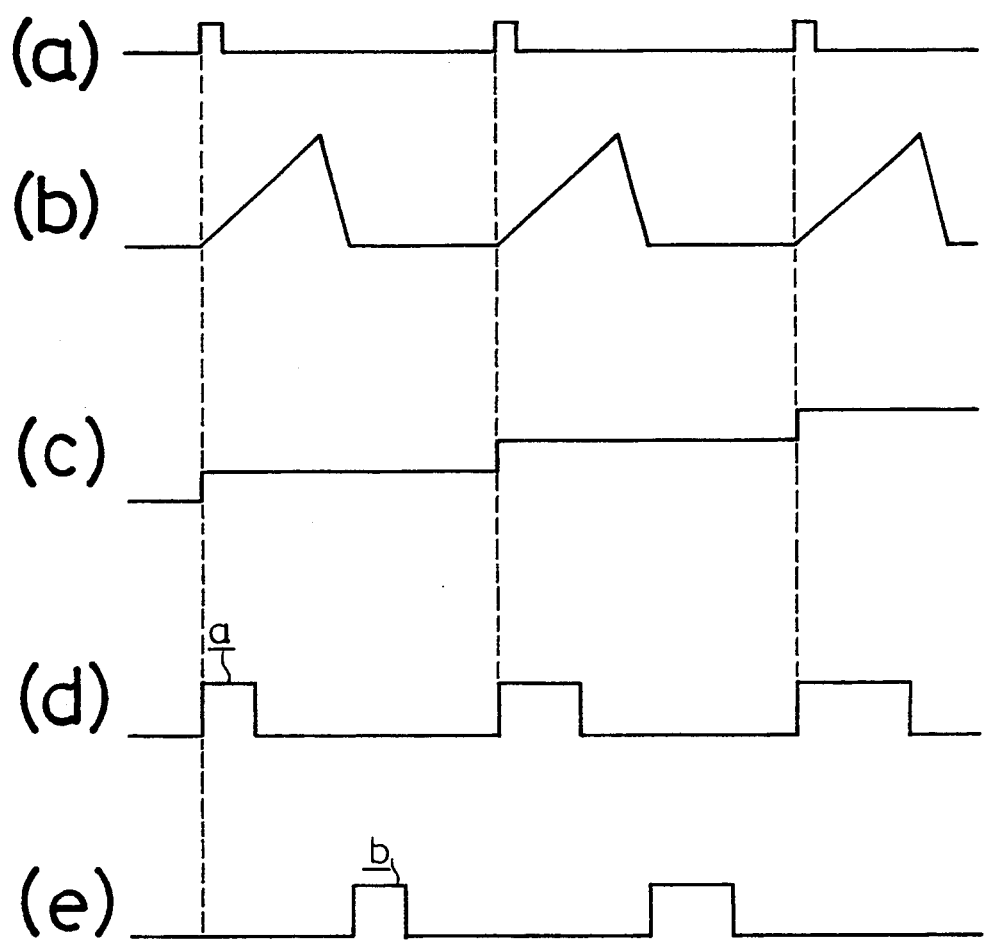
FIG. 2 is a timing chart describing the operation of a PWM modulator employed in the inverter type direct current resistance welding machine shown in FIG. 1.

On the other hand, the D/A converter 40 supplied with the switching device control data produces an analog signal (FIG. 2 line (c)) in synchronization with the timing pulse. Then, the comparator 43 compares the level of the sawtooth wave (FIG. 2 line (b)) outputted by the sawtooth generator 42 and the level of the converted signal outputted by the D/A converter 40 (FIG.

2 line (c)) outputted by the D/A converter 40. During the period in which the level of the sawtooth wave is less than or equal to the level of the converted signal, the comparator 43 produces a PWM modulated output a (FIG. 2 line (d)) having a duty ratio obtained based on the cycle or period of the sawtooth wave and the level of the converted signal. In response to the PWM modulated output a supplied by the comparator 43, the two-phase pulse generator 44 re-generates or passes through the PWM modulated output a, and also generates a PWM modulated output b (FIG. 2 line (e)), which is produced by making a 180° phase shift with respect to the PWM modulated output a.

Then, the PWM modulated output a produced by the two-phase pulse generator 44, is amplified by the driver 38 from which the amplified output is applied to the switching devices S1 and S4, with the result that they are maintained in an ON condition during the period of generation of the PWM modulated output a.

On the other hand, the PWM modulated output a produced by the two-phase pulse generator 44 is amplified by the driver 39 from which the amplified output is supplied to the switching devices S2 and S3, with the result that they are maintained in an ON condition during the period of generation of the PWM modulated output a.

Figure 3:
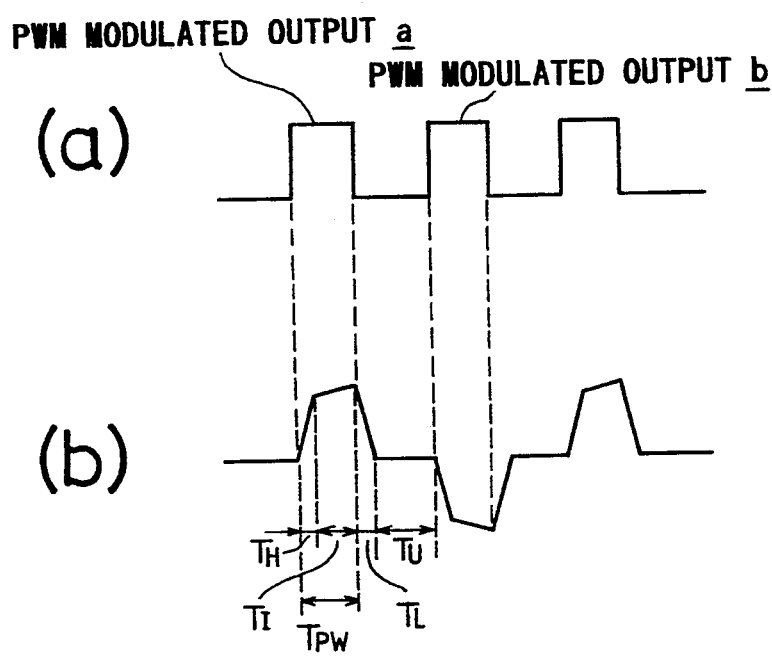
FIG. 3 is a timing chart describing the relationship between PWM modulated outputs and the waveform of a primary current of a welding transformer both produced in the embodiment of the present invention.

A secondary current of the welding transformer 14 is produced in response to the primary current (having the waveform of FIG. 3 line (b)) and flows in the objects 17 used as the test pieces through the welding gun 16, thus joining the objects 17 to each other by resistance welding.

It is known that the pulse width of each of the PWM modulated outputs a and b is controlled so as to be brought into the required or desired secondary current in this way. The waveforms of the PWM modulated outputs a and b are illustrated in FIG. 3, line (a).

As is also apparent from FIG. 3 line (b), the primary current of the welding transformer 14 is represented in the form of a waveform changed in the following manner. For example, the PWM modulated output a abruptly rises from the leading edge thereof. After the PWM modulated output a has reached a substantially constant level, it rapidly falls from the trailing edge thereof. The primary current has a rise period, i.e., a rise time $T_H$, a substantially constant time $T_I$ and a fall time $T_L$. $T_{PW}$ ($=T_H+T_I$) is the width of the PWM modulated wave.

In the case of the PWM modulated output b, a primary current having a waveform identical (but having the opposite sign) to that of the primary current based on the PWM modulated output a, flows in the welding transformer 14.

Now, the rise time $T_H$ and the fall time $T_L$ of the primary current are substantially determined by the primary resistance and inductance of the welding transformer 14 and the required secondary current. Further, the time $T_{PW}$ is decided by the required secondary current. Therefore, these times cannot be set to "0".

However, a time $T_U$ provided between the primary current based on the PWM modulated signal or output a and the primary current based on the PWM modulated signal or output b can be shortened. Hence the upper limit frequency $f_{MAX}$ is decided by setting the time $T_U$ to "0".

Figure 4:
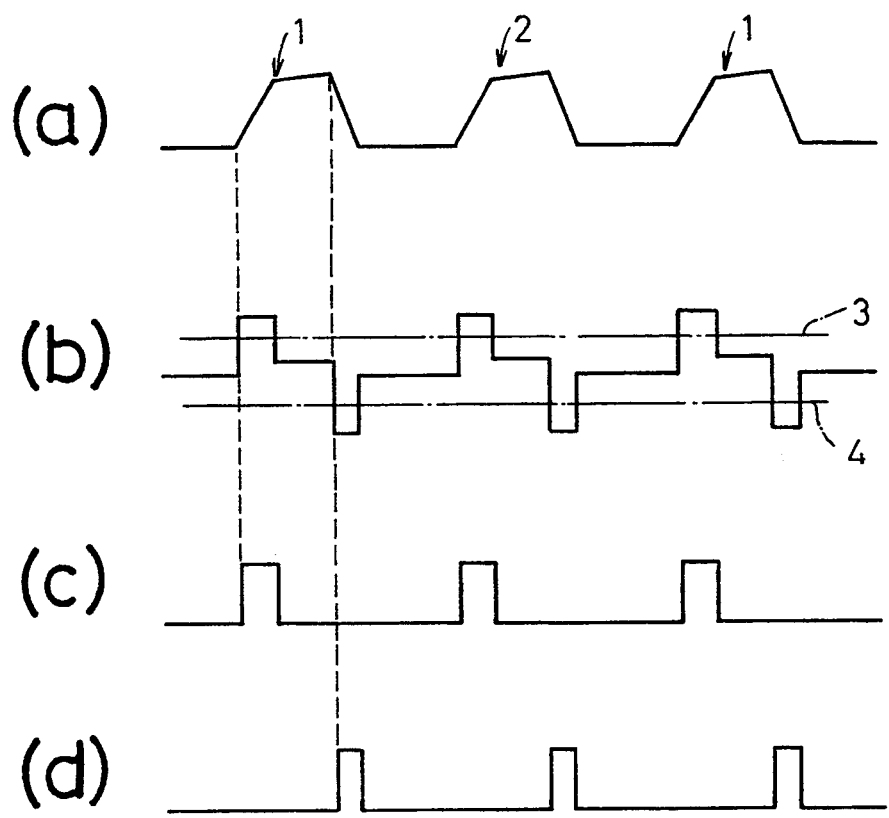
FIG. 4 is a chart describing respective waveforms of outputs produced from a differentiating circuit and comparators both employed in the embodiment of the present invention.

The primary current is detected by the current detecting coil 18. The detected primary current is subjected to full-wave rectification by the rectifying circuit 19, and the rectified output is differentiated by the differentiating circuit 24. The waveform of the output produced by the rectifying circuit 19 is shown in FIG. 4, line (a). Waveform 1 in FIG. 4 line (a) corresponds to the primary current based on the PWM modulated output a, and waveform 2 in FIG. 4 line (a) corresponds to the primary current based on the PWM modulated output b. The waveform of the differentiated output produced by the differentiating circuit 24 is illustrated in FIG. 4 line (b).

The comparator 26 compares the level of the differentiated output produced by the differentiating circuit 24 and the level (see level 3 in FIG. 4 line (b)) of the first set output produced by the level setter 25. The result of comparison of the comparator 26 is represented as an output shown in FIG. 4 line (c). The comparator 27 compares the level of the differentiated output and the level (see level 4 in FIG. 4 line (b)) of the second set output produced by the level setter 25. The result of comparison of the comparator 27 is represented as an output shown in FIG. 4 line (d).

During the period in which output is being generated by the comparator 26 (in response to output a or b), the counter circuit 29 counts the clock pulses inputted by the clock pulse generator 28. Thus, the count of the counter circuit 29 corresponds to the rise time $T_H$. During the period in which output is being generated by the comparator 27, the counter circuit 30 counts the clock pulses inputted by the clock pulse generator 28. Accordingly, the count of the counter circuit 30 corresponds to the fall time $T_L$. The accuracy of counting of the pulses during the rise and fall times $T_H$ and $T_L$ depends on the frequency of the clock pulses generated by the clock pulse generator 28.

Figure 5:
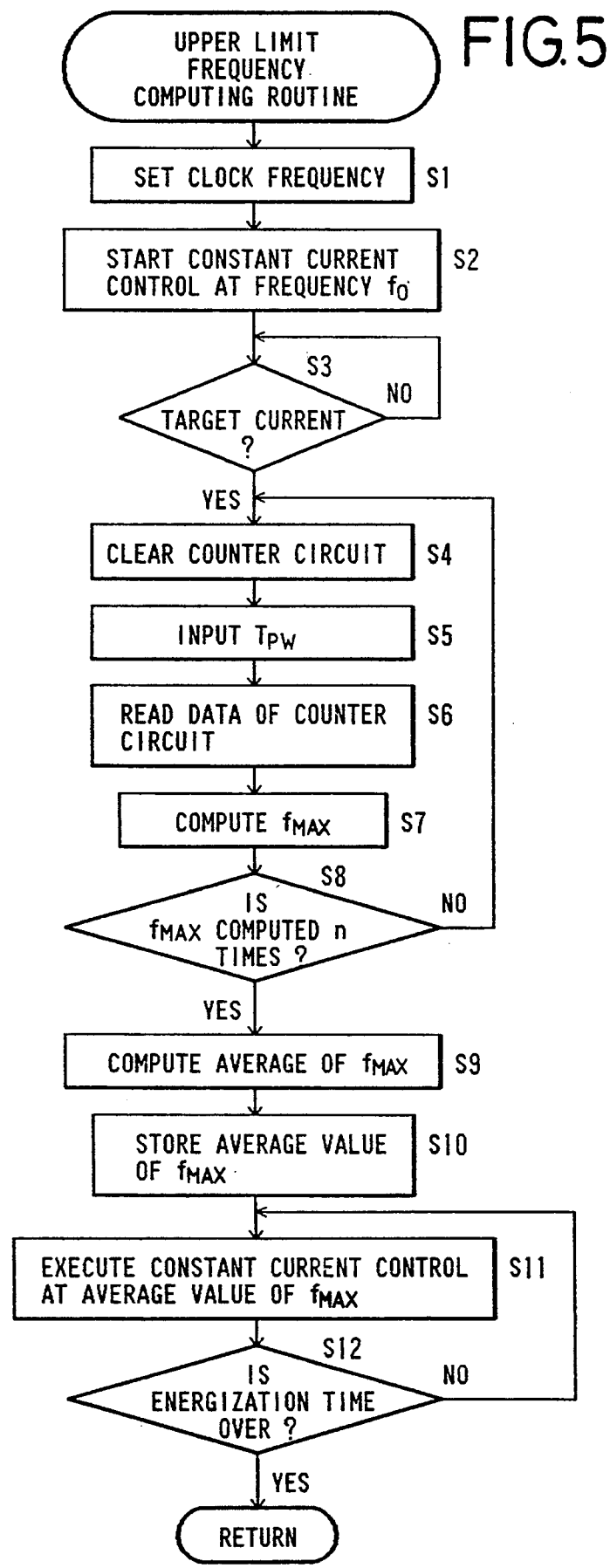
FIG. 5 is a flowchart describing an upper limit frequency computing routine executed in the embodiment of the present invention.

Since the instruction for the computation of the upper limit frequency has been inputted through the input device 36 by the operator, an upper limit frequency computing routine shown in a flowchart in FIG. 5 is next executed.

When the upper limit frequency computing routine is executed, the frequency of the clock pulses generated by the clock pulse generator 28 is established (Step S1). Next, the control of the secondary current is started in accordance with a PWM modulated output based on the characteristic frequency $f_0$ of the transformer 14 (Step S2), where $f_0=(E1/N)/(4 \cdot Ae \cdot Bm)$, E1 is maximum primary voltage, N is the turn ratio, Ae is the cross-sectional area of the core, and Bm is the magnetic flux density of the core. Then the pulse width of each of the PWM modulated outputs a and b, (that is, the duty ratio) is controlled until the value of the secondary current reaches a target secondary-current value inputted through the input device 36, which is associated with the welding gun and the test pieces (Step S3). Control is effected by control device 31 in feedback relationship with secondary current detector 21, etc.

When the value of the secondary current has reached the target secondary-current value in Step S3, the counter circuits 29 and 30 are cleared (Step S4). Then, the time $T_{PW}$ is stored as data in the RAM 34 (Step S5). During the continuation of the control in Step S3, the counts of the counter circuits 29 and 30 are read as described above (Step S6). After the reading of the counts has been made, the upper limit frequency $f_{MAX}$ is repeatedly computed n times (Steps S7 and S8).

The upper limit frequency $f_{MAX}$ is computed by the equation, $f_{MAX}=\{1-2f_0(T_{PW}-T_H)\}/\{2(T_H+T_L)\}$, derived as follows with reference to FIG. 6.

The period corresponding to half the frequency $f_0$ (i.e. $1/(2f_0)$), is represented as $(T_H+T_I+T_L+T_U)$ (see FIG. 6 line (a)). The period corresponding to half the upper limit frequency $f_{MAX}$ (i.e. $1/(2f_{MAX})$) is represented as $(T_H+T_{IA}+T_L)$ (see FIG. 6 line (c)); or rewritten as $T_{IA}=\{1/(2f_{MAX})\}-(T_H+T_L)$.

The current which flows in a load, is determined by secondary voltage of the welding transformer. The secondary voltage is substantially outputted only for either a time $T_I$ (the general case) or $T_{IA}$ (the maximum frequency case) during which the primary current flows. If $V_{2P}$ is the peak secondary voltage, then the average secondary voltage $V_{2AVG}$ of pulse-shaped secondary voltages at the frequency $f_0$ is determined by the equation, $V_{2AVG}=\{T_I/2(f_0)\} \times V_{2P}$. When the same average secondary voltage $V_{2AVG}$ is obtained at the upper limit frequency $f_{MAX}$, then $V_{2AVG}=\{T_{IA}/(2 f_{MAX})\} \times V_{2P}$, from which it follows that $T_I/\{1/(2f_0)\}=T_{IA}/1(2f_{MAX})\}$. This can be rewritten as $T_A=(f_0/f_{MAX})T_I$, or $T_{IA}=(f_0/f_{MAX})(T_{PW}-T_H)$, with reference to FIG. 6 line (c). Combining with the definition of $T_{IA}$, above, results in: $\{1/(2f_{MAX})-(T_H+T_L)=(f_O/f_{MAX})(T_{PW}-T_H)$. Solving for $f_{MAX}$, the desired formula is arrived at.

When the upper limit frequency $f_{MAX}$ is computed n times in Step S8, the arithmetic mean or average of the upper limit frequencies $f_{MAX}$ is computed (Step S9), and stored in RAM 34 as data (Step S10). Then, control for a target secondary current is continuously effected for a predetermined period of time at the averaged $f_{MAX}$, and then the routine is completed (Steps S11 and S12).

According to the present invention, as has been described above, the required secondary current is supplied to the test piece. At this time, the upper limit frequency $f_{MAX}$ of the primary current supplied to the welding transformer 14 is computed based on the times $T_H$ and $T_L$ required for the primary current of the welding transformer 14 to rise and fall, and the time $T_{PW}$ determined by the desired secondary current. Upon welding, the switching devices are controlled based on a train of pulses whose frequency falls within the upper limit frequency $f_{MAX}$. Thus, the control for the primary current supplied to the welding transformer 14 can be accurately effected.

The upper limit frequency $f_{MAX}$ corresponding to the necessary secondary current is computed and stored each time objects to be welded and their corresponding welding guns are combined. By doing so, the setting of the upper limit frequency $f_{MAX}$ can be omitted from a welding system which makes it necessary to set complex welding conditions. It is thus possible to shorten the time required to search and set the welding conditions.

Sometimes, the secondary current produced by supplying the primary current (whose upper limit frequency is $f_{MAX}$) to the welding transformer, is insufficient for some welding purposes. It is thus necessary to increase the upper limit of the frequency of the primary current and to design a welding transformer 14 capable of supplying the desired secondary current. A method for producing such a welding transformer 14 will be explained next.

The primary current in the form of a train of pulses has a rise time $T_H$ and a fall time $T_L$ as described above. The amount $\Delta I/\Delta t$ of change in the primary current (i.e., the primary current change rate, which occurs during either the rise time $T_H$ or the fall time $T_L$) is determined by both the primary resistance and the inductance of the welding transformer 14. Thus, when specifications such as a sectional area of the iron core of the welding transformer 14, the number of turns in the primary coil and the number of turns in the secondary coil are decided, $\Delta I/\Delta t$ becomes a constant value based on the specifications. Therefore, a welding transformer 14 of a type wherein the rise time $T_H$ and the fall time $T_L$ have been shortened, can be produced to have an even higher upper limit frequency, $f_{MAX}$.

When the primary current flows in the welding transformer 14, an electromotive force $V_1$ developed in the primary coil is determined by the following general equation, where $\Phi$ is the magnetic flux induced by the primary current, and N is the turn ratio: $V_1=N(\Delta\Phi/\Delta t)$. When $\Phi=kNI_1$ is substituted, and k is a constant, then $V_1=kN^2(\Delta I_1/\Delta t)$, or rewritten, $(\Delta I_1/\Delta t)=V_1/(kN^2)$.

This equation represents the relationship between N, the turn ratio, and $\Delta I_1/\Delta t$, the amount of change in primary current during either the rise time $T_H$ or the fall time $T_L$ of the primary current. Assuming constant k and constant $V_1$, then the current change rate $\Delta I_1/\Delta t$ with respect to the turn ratio N is determined by computation, as represented by curve (a) of FIG. 7.

Figure 7:
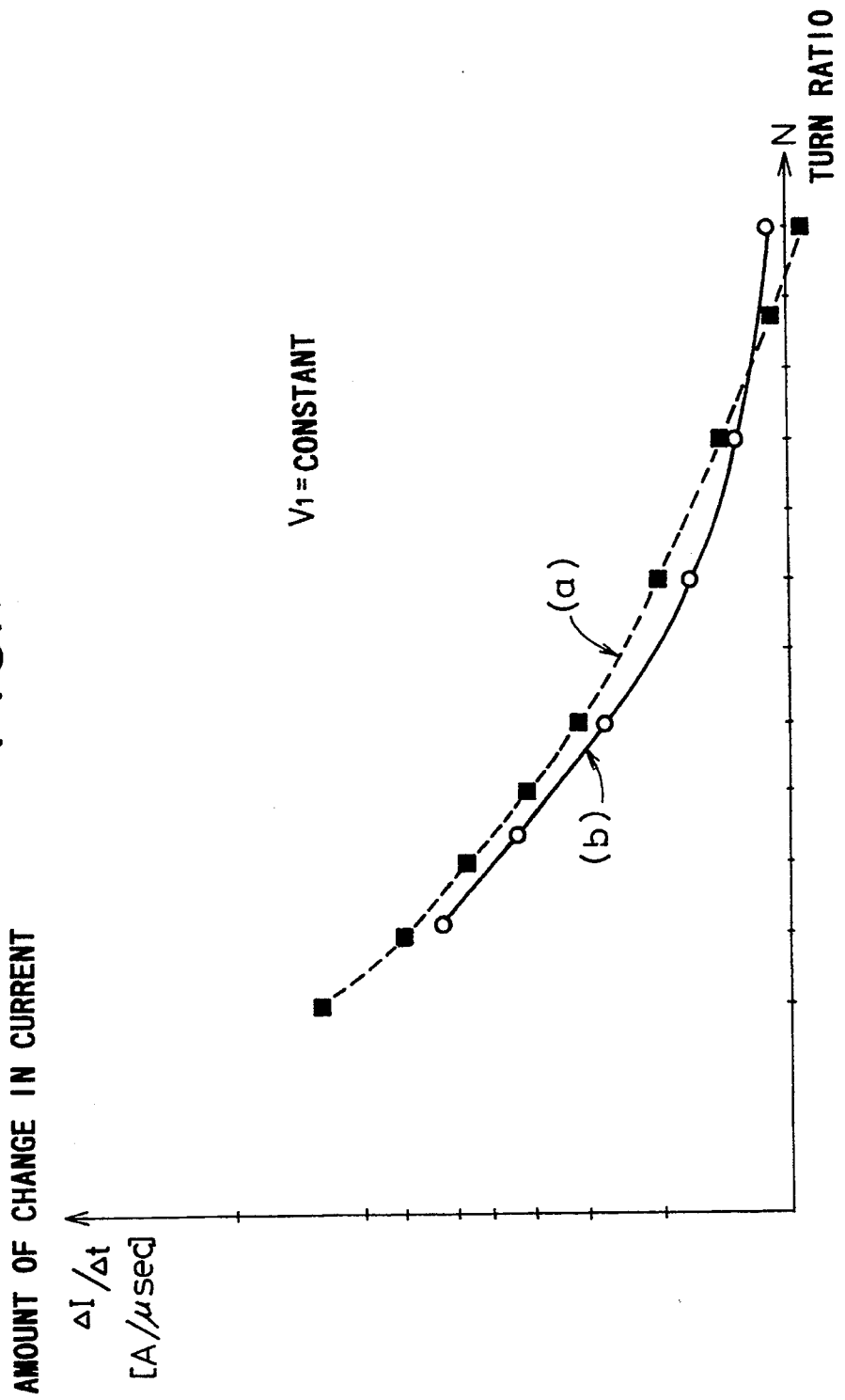
FIG. 7 is a graph describing the relationship between the turn ratio of the welding transformer and the amount of change in the primary current flowing. in the welding transformer.

When the computed primary current change rate $\Delta I_1/\Delta t$ with respect to the turn ratio N is compared with measured experimental values, represented by FIG. 7 curve (b), a very satisfactory correlation is obtained therebetween. It is thus confirmed that the equation is sufficiently practical.

Further, the upper limit frequency $f_{MAX}$ is computed based on each primary current change rate $\Delta I_1/\Delta t$, thereby to determine the relationship between the upper limit frequency $f_{MAX}$ and the turn ratio N.

Noting that $T_H$ is approximately equal to $T_L$, then from FIG. 6 line (c), it is apparent that $$\text{duty}=T_{IA}/\{T_{IA}+2\cdot I_{1MAX}/(\Delta I_1/\Delta t)\}=2\cdot T_{IA}\cdot f_{MAX}$$

or $$f_{MAX}=\tfrac{1}{2}\cdot\{T_{IA}+2\cdot I_{1MAX}/(\Delta I_1/\Delta t)\}$$

The minimum turns ratio is $N_{MIN}=I_{2AVG}/I_{1MAX}$, where $I_{2AVG}$ is the average secondary current, and $I_{1MAX}$ is the maximum primary current. $V_{2AVG}=V_{2PEAK}\times\text{duty}=(V_{1PEAK}/N_{MIN})\times(2\cdot T_{IA}\cdot f_{MAX})$ or duty$=2\cdot T_{IA}\cdot f_{MAX}=V_{2AVG}\times N_{MIN}/V_{1PEAK}$. Accordingly, the desired secondary voltage is a boundary condition of design.

With $N_{MIN}$ thus determined, $\Delta I_1/\Delta t$ can be determined, either from FIG. 7 curve (b) or FIG. 7 curve (a) (or its underlying equation). Thus $f_{MAX}$ is determined.

Figure 8:
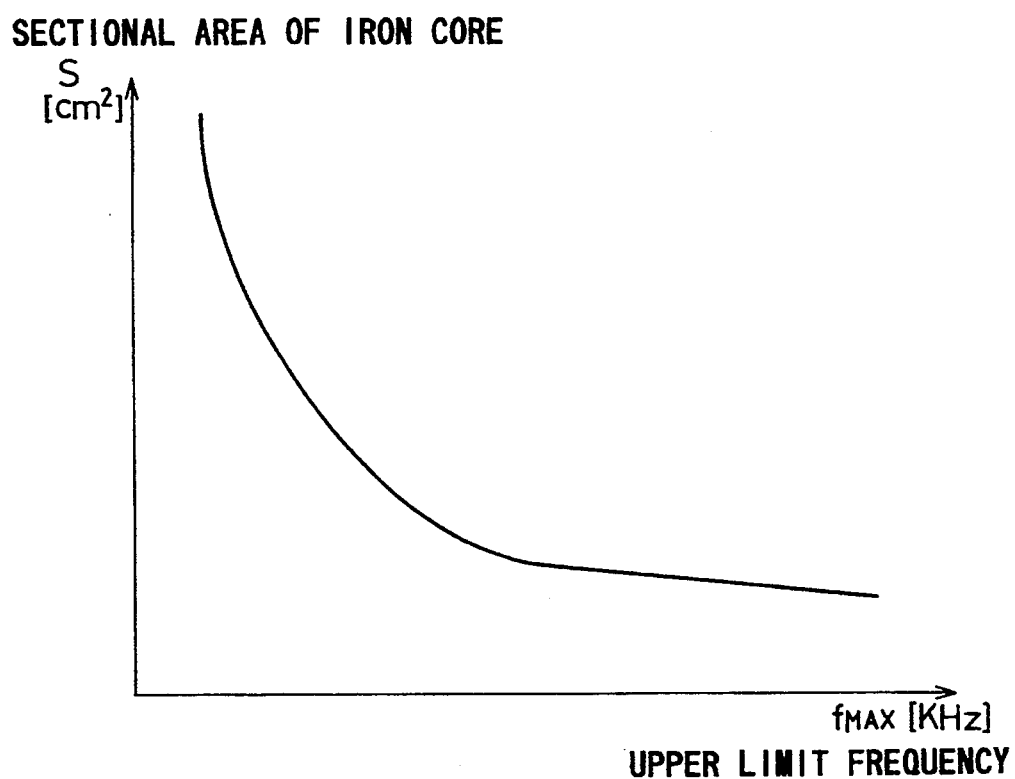
FIG. 8 is a graph describing the relationship between the upper limit frequency of the primary current and the sectional area of an iron core of the welding transformer.

Next, the weight of the welding transformer 14 at each upper limit frequency $f_{MAX}$ is computed from the relationship between the upper limit frequency $f_{MAX}$ and the sectional area of the iron core, shown in FIG. 8. The relationships between each upper limit frequency $f_{MAX}$ and the weight of welding transformer 14, and between each upper limit frequency $f_{MAX}$ and each turn ratio N are determined. These relationships are shown in FIG. 9.

Thus, when the upper limit frequency $f_{MAX}$ of the primary current is decided, both the turn ratio N and the weight of welding transformer 14 can be easily determined from FIG. 9.

FIG. 9 shows the relationship between each of turn ratios $N_0 \sim N_8$ and the weight of the welding transformer 14 at the upper limit frequency $f_{MAX}$ when the capacity of the welding transformer 14 is 140 kVA, for example. If the upper limit frequency $f_{MAX}$ is set to about 3.8 kHz, for example, then the turn ratio N is $N_4$, and the weight of the welding transformer 14 is about 55% of the conventional weight.

According to the present embodiment, as has been described above, the relationship between the primary current change rate $\Delta I/\Delta t$ and the turn ratio N is determined by paying attention to the close relationship between the primary current change rate $\Delta I/\Delta t$ developed during each of the rise and fall times $T_H$ and $T_L$ of the primary current and the turn ratio N of the welding transformer 14. Further, the relationship between the upper limit frequency $f_{MAX}$ and the turn ratio N, and the relationship between the upper limit frequency $f_{MAX}$ and the cross-sectional area of the iron core of the welding transformer 14 will be apparent by determining the upper limit frequency $f_{MAX}$ from the primary current change rate $\Delta I/\Delta t$. Thus, a small-sized and light welding transformer operable at a desired upper limit frequency $f_{MAX}$ can be obtained.

Having now fully described the invention, it will be apparent to those skilled in the art that many changes and modifications can be made without departing from the spirit or scope of the invention as set forth herein.

What is claimed is:

1. A method of controlling a direct current resistance welding machine, comprising:
    a first step of detecting a primary current of a welding transformer coupled to an inverter having a plurality of switching devices controlled by corresponding pulses having a predetermined frequency and a time width corresponding to a value of a desired secondary current;
    a second step of detecting rise and fall times of the detected primary current; and
    a third step of computing an upper limit frequency of the primary current based on said time width and said rise and fall times,
    whereby the primary current of said welding transformer is controlled by controlling said switching devices based on pulses having a frequency falling within said upper limit frequency.

2. The method of controlling a direct current resistance welding machine according to claim 1, wherein said rise time is detected from a value obtained by counting clock pulses during a period in which a level of a differentiated waveform of the primary current is greater than a first set value.

3. The method of controlling a direct current resistance welding machine according to claim 1, wherein said fall time is detected from a value obtained by counting clock pulses during a period in which a level of a differentiated waveform of the primary current is less than a second set value.

4. The method of controlling a direct current resistance welding machine according to claim 2, wherein said fall time is detected from a value obtained by counting clock pulses during a period in which the level of the differentiated waveform of the primary current is less than a second set value.

5. The method of controlling a direct current resistance welding machine according to claims 1, 2, 3 or 4, wherein said upper limit frequency is computed by:

$$\{1-2f_0(T_{PW}-T_H)\}/\{2(T_H+T_L)\}$$

where $f_0$, $T_{PW}$, $T_H$ and $T_L$ respectively represent a characteristic frequency of said welding transformer, said time width of each pulse corresponding to the value of the desired secondary current, said rise time of the primary current and said fall time of the primary current.

6. A direct current resistance welding machine comprising:
    an inverter having a plurality of switching devices controlled by corresponding pulses having a predetermined frequency, each said pulse having a time width corresponding to a value of a desired secondary current;
    detector for detecting a primary current of a welding transformer coupled to said inverter;
    differentiator for differentiating the detected primary current;
    first and second comparators for comparing a level of an output produced from said differentiator with a first predetermined level and for comparing the level of said output with a second predetermined level, respectively;
    first and second measuring means for measuring output producing periods of said first and second comparing means, respectively; and
    computing circuit for computing an upper limit frequency of the primary current of said welding transformer based on the periods measured by said first and second measuring circuits and said time width,
    whereby a frequency of the primary current of said welding transformer is controlled by controlling said switching devices based on said pulses having a frequency falling within said upper limit frequency.

7. The direct current resistance welding machine according to claim 6, wherein said first comparators produces an output during a period in which a level of a waveform of the differentiated primary current output by said differentiating means is larger than the first predetermined level.

8. The direct current resistance welding machine according to claim 7, wherein said second comparators produces an output during a period in which the level of the waveform of the differentiated primary current output by said differentiating means is smaller than the second predetermined level.

9. The direct current resistance welding machine according to claims 6, 7 or 8, wherein the first and second predetermined levels are levels which have been set in advance by respective first and second level setters.

10. The direct current resistance welding machine according to claims 6, 7 or 8, wherein said first measuring circuits measures a rise time of the primary current from a value obtained by counting clock pulses during the output producing period of said first comparing means.

11. The direct current resistance welding machine according to claims 6, 7 or 8, wherein said second measuring circuits measures a fall time of the primary current from a value obtained by counting clock pulses during the output producing period of said second comparing means.

12. A direct current resistance welding machine comprising
    an inverter having a plurality of switching devices driven by pulses having a predetermined frequency, each of said pulses having a time width corresponding to a value of a desired secondary current;

a welding transformer having an iron core and predetermined cross-sectional area with primary and secondary windings having a predetermined turn ratio N; and means for supplying primary current to said welding transformer, said primary current having a predetermined upper limit frequency determined based on an amount of change in primary current per unit time $\Delta I_1/\Delta t$ during either a rise or fall of said primary current, and on said turn ratio of the primary and secondary windings of said welding transformer, wherein a cross-sectional area of said iron core of said welding transformer is determined based on said predetermined upper limit frequency, and wherein said amount of change in said primary current per unit time is determined from said turn ratio as follows:

$$\Delta I_1/\Delta t = V_1/(kN^2)$$

where k is a constant and $V_1$ is an electromotive force of said primary coil.

* * * * *